United States Patent Office 3,833,572
Patented Sept. 3, 1974

3,833,572
PREPARATION OF CEPHALOSPORINS HAVING A SUBSTITUTED METHYL GROUP AT POSITION-3 BY REACTION OF A 3-HALOMETHYL CEPHALOSPORIN WITH AN ONIUM SALT
John Colin Clark, Gerrards Cross, and Joseph Elks, London, England, assignors to Glaxo Laboratories Limited, Greenford, England
No Drawing. Filed Jan. 21, 1972, Ser. No. 219,858
Claims priority, application Great Britain, Dec. 22, 1971, 3,202/71
Int. Cl. C07d 99/24
U.S. Cl. 260—243 C
10 Claims

ABSTRACT OF THE DISCLOSURE

A process for preparing cephalosporin compounds having a substituted methyl group at the 3-position which comprises reacting a corresponding cephalosporin compound having a different substituted methyl group at the 3-position with an onium salt which is soluble in aprotic media, the anion of the onium salt corresponding to the desired methyl substituent.

---

This invention is concerned with improvements in or relating to cephalosporin compounds.

The cephalosporin compounds referred to in this specification are generally named with reference to cepham (see *J. Amer. Chem. Soc.* 1962, 84, 3400). The term "cepham" refers to the basic cepham ring structure with one double bond.

7β-Acylamidoceph-3-em-4-carboxylic acids having a substituted methyl group at the 3-position are generally of interest in that they posses antibiotic activity. Many of the currently available processes for the manufacture of such cephalosporin compounds suffer from the disadvantage that they have to be carried out in protic solvents. The use of some protic solvents leads to competitive reactions taking place with consequent reduction in yield of the desired end compound. We have now found that a wide variety of 3-substituted methyl cephalosporin compounds may be prepared by a novel process involving the use of onium salts soluble in aprotic solvents.

The invention provides a process for the preparation of a cephalosporin compound having a substituted methyl group at the 3-position by reacting a corresponding cephalosporin compound having a differently substituted methyl group at the 3-position with an onium salt, the anion of which corresponds to the desired substituent on the methyl group.

In particular the process according to the invention comprises reacting a compound of the formula

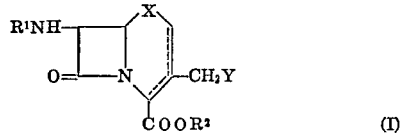

(wherein R¹ is hydrogen or a carboxylic acyl group, Y is a replaceable residue of a nucleophile which may be an organic or inorganic group preferably halogen viz. chlorine, bromine or iodine, R² is hydrogen or a carboxyl-blocking group (which can be split off subsequently), X is >S or >S→O (α or β) and the dotted line bridging the 2-, 3- and 4-positions indicates that the compound may be a ceph-2-em or ceph-3-em compound), with an onium salt of the formula $$[(R^3)_n A]^+ Z^-$$  (II)

[wherein the various R³ groups, which may be the same or different, are each hydrogen or organic substituting groups having from 1–20 carbon atoms provided that the R³ groups together contain at least two carbon atoms, A is nitrogen, phosphorus, arsenic, antimony or sulphur, n is either 3 or 4 and Z⁻ is an organic or inorganic anion corresponding to the acid ZH; the acid ZH preferably having a pKa greater than that of the acid YH but not more than 14 (as measured in water at 25° C.)].

The onium salts preferably have a distribution constant

of more than 0.1.

The onium salts of the formula (II) are generally soluble in hydrophobic liquids. The process according to the invention may thus be carried out in an aprotic solvent.

To ensure some solubility in aprotic solvents the requirement of the R³ groups to provide at least two carbon atoms is imposed on the onium salt. However, it will be appreciated that the invention is not limited to reactions in aprotic solvents and that this is only a convenience which takes advantage of the properties of the onium salt. In any event, use of aprotic solvents precludes competition from other nucleophiles.

Aprotic solvents

Suitable aprotic solvents in which the process according to the invention may be carried out include halogenated hydrocarbons e.g. methylene chloride or chloroform; hydrocarbons e.g. benzene or toluene; cyclic or acyclic ethers e.g. tetrahydrofuran, dioxan, 1,2-dimethoxyethane or diethyl ether and esters e.g. ethyl acetate.

Reaction conditions

The reaction may be carried out at a temperature of from −100° to +85° C. e.g. −20° to +85° C., preferably from −80 to +35° C. e.g. −5 to +35° C. The freezing point of the chosen solvent may impose a limitation on the temperature at which the process may be effected. The course of the reaction may be followed by thin-layer or paper chromatography and by ultra-violet spectroscopy.

The invention will now be further described with reference to the onium salt (II) and the cephalosporin starting material (I).

Onium Salts

The onium salt is preferably chosen so that not more than one of the R³ groups is hydrogen. Suitable R³ groups include alkyl e.g. having from 1 to 8 carbon atoms, preferably from 3 to 8 carbon atoms, such as n-propyl, n-butyl, isoamyl etc.; cycloalkyl e.g. cyclopentyl or cyclohexyl; aryl (lower alkyl) e.g. benzyl or phenethyl groups; or aryl e.g. phenyl. If desired two of the R³ groups may, together with the "A" atom, form a cyclic structure which may contain 5- or 6-ring members.

In the anion Z⁻, charge and nucleophilic properties may be concentrated on a carbon, oxygen, halogen, sulphur, phosphorus or nitrogen atom and the anion may be ambidentate or polydentate.

If it is desired that the nucleophilic properties of Z⁻ are to be concentrated on a carbon atom, Z⁻ may be the moiety [CR⁴R⁵R⁶]⁻ wherein one, and preferably, at least two of the groups R⁴, R⁵ and R⁶ are of an electronegative nature. Suitable electronegative groups include ester groups, acyl groups, nitro groups and nitrile groups. Thus the electronegative group may be —CO₂R⁷, —COR⁷, —S(O)R⁷, —S(O)₂R⁷, —NO₂ or —CN wherein R⁷ may represent an alkyl group, e.g. a lower alkyl group such as methyl, ethyl, n-propyl, isopropyl or t-butyl; an aralkyl group such as benzyl; an aryl group such as phenyl or naphthyl; or a cycloalkyl group such as cyclohexyl or cyclopentyl. Such electronegative groups stabilise the anion and therefore make it easier to form. The remaining $R^4$, $R^5$ and $R^6$ group(s) may be any organic substituting group such as any of the groups listed above for $R^7$ or hydrogen.

If the nucleophilic properties of $Z^-$ are to be concentrated on an oxygen atom the onium salt may be derived from a compound containing an OH group provided it fulfils the pKa requirement of the acid ZH. Suitable ZH compounds are acids such as acetic acid.

If the nucleophilic properties of $Z^-$ are to be concentrated on a halogen atom, the halogen atom is preferably chlorine, bromine or iodine.

The nucleophilic properties of $Z^-$ may be concentrated on a sulphur atom by employing as ZH, in the preparation of the onium salt, a compound containing an —SH group e.g. a thiol, substituted thiol, thiophenol, substituted thiophenol or thio-acid. Preferred compounds of the —SH type are the lower alkane thiols e.g. methane thiol, ethane thiol, n-propane thiol and isopropane thiol. Other $Z^-$ groups in which the nucleophilic atom is sulphur are thiosulphate, sulphinate and sulphite. An onium salt in which the nucleophilic properties of $Z^-$ are concentrated on a nitrogen atom may be an azide, nitrite, nitrate or isocyanide.

It is preferred that the atom on which the nucleophilic properties of $Z^-$ are concentrated in the onium salt should not be the same as A.

The onium salts may be prepared by contacting the acid ZH with a compound $[(R^3)_nA]^+B^-$ in which $R^3$, $n$ and A have the above-defined meanings and the acid BH has a pKa (as measured in water at 25° C.) greater than that of the acid ZH. Contact may be achieved in two phase systems e.g. solvent and water, such as chlorinated hydrocarbon and water. The onium salt may be prepared in an aprotic solvent of the type outlined above for the process according to the invention and, as a matter of convenience, the solvent in which the onium salt is prepared may be the same as the solvent in which it is intended to effect the reaction of cephalosporin starting material and onium salt.

In the preparation of onium salts in which A is nitrogen, the compound $[(R^3)_nA]^+B^-$ may be $$[(R^3)_4N]^+OH^-$$

and may be derived from a secondary or tertiary amine. The compound $[(R^3)_4N]^+OH^-$ may thus be tetraethylammonium hydroxide, tetra(n-propyl) ammonium hydroxide or tetra(n-butyl)ammonium hydroxide. The four $R^3$ groups need not be the same and a suitable "mixed" compound is N-benzyl N,N,N-trimethylammonium hydroxide.

If desired, Z may be a complex ion so that the onium salt may, for example, be $[R^3{}_4U]^+[Ag(CN)_2]^-$ and $[R^3{}_4As]^+[Ag(CN)_2]^-$ and in such cases $R^3$ is preferably aryl e.g. phenyl. These complex ions act as sources of ambidentate ions.

As nitrogen cannot exceed its tetravalency, use of ammonium salts avoids some of the complications in, for example, the chemistry of the phosphonium salts, in which the P atom may change its valency. We also prefer that ZH should be a weaker acid by at least one pKa unit in the solvent of reaction than the most acidic proton in the group $R^3$, to curtail, for example, competition, from ylid forms of the onium salt (II)

However, ylids may be used to make the required salts by reactions of the type:

$(R^3)_{n-1}A^+$—$B^-$+ZH→$[(R^3)_{n-1}A.H]^+Z^-$ where B is $CX_2$ or $\overline{N}X$, where X is an $R^3$ group or an electronegative group as defined above e.g. $R^4$, $R^5$ and $R^6$. It is preferable that such ylids are weaker bases than $Z^-$.

Cephalosporin Starting Material

The group $R^1$ in the above formula may represent a wide variety of acylamido groups which may contain 1–20 carbon atoms. Specific acyl groups, some of which may react with the onium salt, are illustrated in the accompanying list which is not intended to be exhaustive:

(i) $R^uC_nH_{2n}CO$— where $R^u$ is aryl (carbocyclic or heterocyclic), cycloalkyl, substituted aryl, substituted cycloalkyl, cyclohexadienyl, or a non-aromatic or mesoionic heterocyclic group, and $n$ is an integer from 1–4. Examples of this group include phenylacetyl; substituted phenylacetyl e.g. fluoro-, nitro-, amino-, acetoxy-, methoxy-, methyl-, or hydroxy-phenylacetyl; N,N-bis(2-chloroethyl) aminophenylpropionyl; thien-2- and -3-ylacetyl; 4-isoxazolyl and substituted 4-isoxazolylacetyl; pyridylacetyl; tetrazolylacetyl or a sydnoneacetyl group. The substituted 4-isoxazolyl group may be a 3 - aryl-5-methyl isoxazol-4-yl group, the aryl group being e.g. phenyl or halophenyl e.g. chloro- or bromo-phenyl. An acyl group of this type is 3-o-chlorophenyl-5-methyl isoxazol-4-yl-acetyl.

(ii) $C_nH_{2n+1}CO$— where $n$ is an integer from 1–7. The alkyl group may be straight or branched and, if desired, may be interrupted by an oxygen or sulphur atom or substituted by e.g. a cyano group, a carboxy group, an alkoxycarbonyl group, a hydroxy group or a carboxycarbonyl group (—CO.COOH). Examples of such groups include cyanoacetyl, hexanoyl, heptanoyl, octanoyl and butylthioacetyl.

(iii) $C_nH_{2n-1}CO$— where $n$ is an integer from 2–7. The alkenyl group may be straight or branched and, if desired, may be interrupted by an oxygen or a sulphur atom. An example of such a group is allylthioacetyl.

(iv) 

where $R^u$ has the meaning defined under (i) and in addition may be benzyl, and $R^v$ and $R^w$ which may be the same or different each represent hydrogen, phenyl, benzyl, phenethyl or lower alkyl. Examples of such groups include phenoxyacetyl, 2-phenoxy-2-phenylacetyl, phenoxypropionyl, 2-phenoxybutyryl, benzyloxycarbonyl, 2-phenoxypropionyl, 2-phenoxybutyryl, methylthiophenoxyacetyl.

(v) 

where $R^u$ has the meaning defined under (i) and, in addition, may be benzyl $R^v$ and $R^w$ have the meanings defined under (iv). Examples of such groups include S-phenylthioacetyl, S-chlorophenylthioacetyl, S-fluorophenpythioacetyl, pyridylthioacetyl, and S-benzylthioacetyl.

(vi) $R^uZ(CH_2)_mCO$— where $R^u$ has the meaning defined under (i) and, in addition, may be benzyl, Z is an oxygen or sulphur atom and $m$ is an integer from 2–5. An example of such a group is S-benzylthiopropionyl.

(vii) $R^uCO$— where $R^u$ has the meaning defined under (i). Examples of such groups include benzoyl, substituted benzoyl (e.g. aminobenzoyl), 4-isoxazolyl- and substituted 4-isoxazolylcarbonyl, cyclopentanecarbonyl, sydnonecarbonyl, naphthoyl and substituted naphthoyl (e.g. 2-ethoxynaphthoyl) quinoxalinylcarbonyl and substituted quinoxalinylcarbonyl (e.g. 3 - carboxy-2-quinoxalinylcarbonyl). Other possible substituents for benzoyl include alkyl, alkoxy, phenyl or phenyl substituted with carboxy, alkylamido, cycloalkylamido, allylamido, phenyl(lower)alkyl amido, morpholinocarbonyl, pyrrolidinocarbonyl, piperidinocarbonyl, tetrahydropyridino, furfurylamido or N-alkyl-N-anilino, or derivatives thereof, and such substitutents may be in the 2- or 2- and 6-positions. Examples of such substituted benzoyl groups are 2,6-dimethoxybenzoyl, 2-methylamidobenzoyl and 2-carboxybenzoyl. Where the group $R^u$ represents a substituted 4-isoxazolyl group, the substituents may be as set out above under (i). Examples of such 4-isoxazolyl groups are 3-phenyl-5-methyl-isoxazol-4-yl carbonyl, 3-o-chlorophenyl-5-methyl-isoxazol-4-yl carbonyl and 3-(2,6-dichlorophenyl)-5-methyl-isoxazol-4-yl carbonyl.

(viii)  

where $R^u$ has the meaning defined under (i) and X is amino, substituted amino (e.g. acylamido or a group obtained by reacting the α-aminoacylamido group of the 7-side chain with an aldehyde or ketone e.g. acetone, methylethylketone or ethyl acetoacetate), hydroxy, carboxy, esterified carboxy, triazolyl, tetrazolyl, cyano, halogeno, acyloxy (e.g. formyloxy or lower alkanoyloxy) or etherified hydroxy group. Examples of such acyl groups are α-aminophenylacetyl, and α-carboxyphenylacetyl.

(ix) 

where $R^x$, $R^y$ and $R^z$ which may be the same or different may each represent lower alkyl, phenyl or substituted phenyl or $R^x$ represents hydrogen. An example of such an acyl group is triphenylcarbonyl (x) 

where $R^u$ has the meaning defined under (i) and in addition may be hydrogen, lower alkyl or halogen substituted lower alkyl, and Y represents oxygen or sulphur. An example of such a group is $Cl(CH_2)_2NHCO$.

(xi) 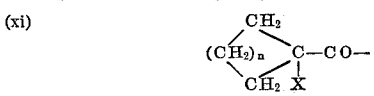

where X has the meaning defined under (viii) above and n is an integer of from 1 to 4. An example of such an acyl group is 1-aminocyclohexanecarbonyl.

(xii) Amino acyl, for example

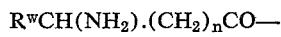

where $n$ is an integer from 1–10 or

where $m$ is zero or an integer from 1–10, and $n$ is 0, 1 or 2, $R^w$ is a hydrogen atom or an alkyl, aralkyl or carboxy group or a group as defined under $R^u$ above, and Ar is an arylene group, e.g. p-phenylene or 1,4-naphthylene. Examples of such groups are disclosed in British Patent Specification No. 1,054,806. A group of this type is the p-aminophenylacetyl group. Other acyl groups of this type include those, e.g. σ-aminoadipoyl, derived from naturally occurring amino acids ad derivatives thereof e.g. N-benzoyl-σ-aminoadipoyl.

(xiii) Substituted glyoxylyl groups of the formula $R^y.CO.CO$— where $R^y$ is an aliphatic, araliphatic or aromatic group, e.g. a thienyl group, a phenyl group, or a mono-, di- or tri-substituted phenyl group, the substituents being, for example, one or more halogen atoms (F, Cl, Br, or I), methoxy groups, methyl groups or amino groups, or a fused benzene ring. Included in this group are also the α-carbonyl derivatives of the above substituted glyoxylyl groups, formed for example with hydroxylamine, semicarbazide, thiosemicarbazide, isoniazide or hydrazine.

(xiv) Formyl.

(xv) Hydrocarbyloxycarbonyl and substituted hydrocarbyloxy groups (wherein the 7-amino groups forms part of a urethane), in particular lower alkoxycarbonyl groups (such as methoxycarbonyl, ethoxycarbonyl and, most preferably, t-butoxycarbonyl groups); halo lower alkoxycarbonyl groups e.g. 2,2,2-trichloroethoxycarbonyl; aralkoxycarbonyl groups such as benzyloxycarbonyl, 4-methoxybenzyloxycarbonyl, diphenylmethoxycarbonyl and 4-nitrobenzyloxycarbonyl groups. Cycloalkoxycarbonyl groups are also advantageous, especially the adamantyloxycarbonyl group.

(xvi) Haloformyl e.g. chloroformyl.

The group Y is preferably chosen so that the acid HY has a pKa of not more than 4 (as measured in water at 25° C.). Suitable Y groups thus include halogens; formyloxy; acetoxy having at least one electron-withdrawing group on the α-carbon atom, e.g. dichloroacetoxy; a nuclear substituted benzoyloxy group, the nuclear substituent being of the electron withdrawing type; or an isothiocyanato group. Suitable Y groups are described in more detail in British Pat. No. 1,241,657. Preferred Y groups include chlorine, bromine and iodine.

Any esterifying group protecting the 4-carboxyl group of formula 1 is preferably formed with an alcohol (aliphatic or araliphatic), phenol, silanol, stannanol or acid which may readily be split off at a later stage of the reaction.

Suitable esters thus include compounds containing as ester group a group selected from the following list which is not intended to be an exhaustive list of possible ester groups.

(i) —$COOCR^aR^bR^c$ wherein at least one of $R^a$, $R^b$ and $R^c$ is an electron-donor e.g. p-methoxyphenyl, 2,4,6-trimethylphenyl, 9-anthryl, methoxy, acetoxy or fur-2-yl. The remaining $R^a$, $R^b$ and $R^c$ groups may be hydrogen or organic substituting groups. Suitable ester groups of this type include p-methoxybenzyloxycarbonyl and 2,4-6-trimethylbenzyloxy-carbonyl.

(ii) —$COOCR^aR^bR^c$ wherein at least one of $R^a$, $R^b$ and $R^c$ is an electron-attracting group e.g. benzoyl, p-nitrophenyl, 4-pyridyl, trichloromethyl, tribromomethyl, iodomethyl, cyanomethyl, ethoxycarbonylmethyl, arylsulphonylmethyl, 2-dimethylsulphoniumethyl, o-nitrophenyl or cyano. The remaining $R^a$, $R^b$ and $R^c$ groups may be hydrogen or organic substituting groups. Suitable esters of this type include benzoylmethoxycarbonyl, p-nitrobenzyloxycarbonyl, 4-pyridylmethoxycarbonyl, 2,2,2-trichloroethoxycarbonyl and 2,2,2-tribromoethoxycarbonyl.

(iii) —$COOCR^aR^bR^c$ wherein at least two of $R^a$, $R^b$ and $R^c$ are hydrocarbon such as alkyl e.g. methyl or ethyl, or aryl e.g. phenyl and the remaining $R^a$, $R^b$ and $R^c$ group, if there is one, is hydrogen. Suitable ester groups of this type include, t-butyloxycarbonyl, t-amyloxycarbonyl, diphenylmethoxycarbonyl and triphenylmethoxycarbonyl, (iv) —$COOR^d$ wherein $R^d$ is adamantyl, 2-benzyloxyphenyl, 4-methylthiophenyl, tetrahydropyran-2-yl or tetrahydrofur-2-yl.

Silyl esters may conveniently be prepared from a halosilane or a silazane of the formula $R^4{}_3SiX$; $R^4{}_2SiX_2$; $R^4{}_3Si.NR^4{}_2$; $R^4{}_3Si.NH.SiR^4{}_3$; $R^4{}_3Si.NH.COR^4$;

$R^4NH.CO.NR^4.SiR^4{}_3$; or $R^4C(OSiR^4{}_3):NSiR^4{}_3$ where X is a halogen and the various groups $R^4$, which can be the same or different, represent hydrogen atoms or alkyl, e.g. methyl, ethyl, n-propyl, iso-propyl; aryl, e.g. phenyl; or aralkyl e.g. benzyl groups.

Preferred derivatives of silanols are silyl chlorides such as for example trimethylchlorosilane and dimethyldichlorosilane.

The carboxyl groups may be regenerated from an ester by any of the usual methods; for example, acid- and base-catalysed hydrolysis (especially for silyl and stannyl esters) is generally applicable, as well as enzymically-catalysed hydrolyses; however, aqueous mixtures may be poor solvents for these compounds and they may cause isomerizations, rearrangements, side-reactions, and general destruction, so that special methods may be desirable. Suitable methods of deesterification are described below:

(1) Reactions with Lewis acids

Suitable Lewis acids for reaction with the esters include trifluoroacetic acid, formic acid, hydrochloric acid in acetic acid, $ZnBr^+$ in benzene and aqueous solutions or suspensions of mercuric compounds. The reaction with the Lewis acid may be improved by addition of a nucleophile such as anisole.

(2) Reduction

Suitable systems for effecting reduction are zinc/acetic acid, zinc/formic acid, zinc/lower alcohol, zinc/pyridine, palladised-charcoal and hydrogen, electrolysis, and sodium and liquid ammonia.

(3) Attack by nucleophiles

Suitable nucleophiles are those containing a nucleophilic oxygen or sulphur atom for example compounds liberating hydroxyl groups and thiophenols.

(4) Oxidative methods

For example, which involve the use of hydrogen peroxide and acetic acid.

(5) Irradiation

End Products: Except when the onium salt is a complex, the product of the reaction will generally have the formula

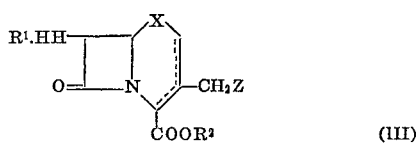

(III)

wherein $R^1$, $R^2$, X and Z have the above defined meanings.

In the case of onium salts in which the nucleophilic properties of $Z^-$ are concentrated on a carbon atom the process according to the invention may lead to the formation of compounds having a group

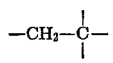

at the 3-position. For example, where $Z^-$ has the formula

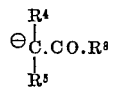

one will obtain compounds of the formula

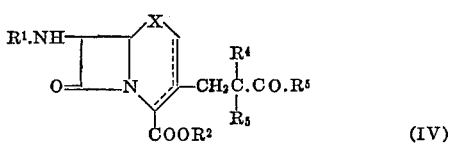

(IV)

wherein $R^1$, $R^2$, X, $R^4$ and $R^5$ have the above defined meanings and $R^8$ may be $R^7$ or $OR^7$ wherein $R^7$ has the above defined meanings.

The compounds of formula (IV) are of value in that they may either possess a high level of antibacterial activity in their own right or may be of value as intermediates in the preparation of cephalosporin compounds having antibacterial activity.

In particular the process according to the invention may lead to compounds of the formula

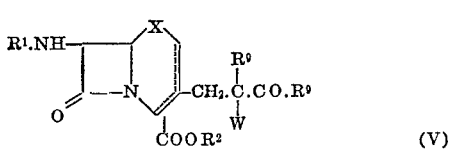

(V)

wherein $R^1$, $R^2$ and X have the above defined meanings, $R^9$ is hydrogen or $R^7$ (which has the above defined meaning) and W is CN or $COOR^9$ wherein the $R^9$ groups may be the same or different.

When W=CN that group may be converted to $COOR^9$ and compounds of formula (V) wherein $W=COOR^9$ may be decarboxylated to yield compounds of the formula (V) in which $W=R^9$ by the method described in Belgian Pat. 764,842.

When the molecule ZH contains a further potentially acidic hydrogen atom, two molecular proportions of the cephalosporin compound may combine with one of the onium salt (II). A bis cephalosporin that we have prepared is methyl 2 - cyano-2,2-bis[4-diphenylmethoxycarbonyl - 7β - (2-thienyl-acetamido)ceph-3-em-3-ylmethyl] acetate. In general, equimolar quantities of the reagents unite predominantly in a 1:1 fashion.

In Belgian Pat No. 764,842 we have described new compounds of the formula

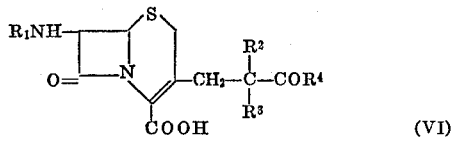

(VI)

(wherein $R^1$ is a carboxylic acyl group; $R^2$ and $R^3$, which may be the same or different, are selected from hydrogen, lower alkyl, phenyl, substituted phenyl, lower alkoxycarbonyl, mono- or di-aryl lower alkoxycarbonyl, lower alkylcarbonyl, aryl lower alkyl or $C_5$ or $C_6$ cycloalkyl and R4 is selected from hydrogen, lower alkyl, phenyl, substituted phenyl, aryl lower alkyl or $C_5$ or $C_6$ cycloalkyl) and non-toxic derivatives thereof.

By the process according to the present invention one can prepare compounds falling within the general formula (VI). New compounds that we have prepared falling within this general formula are 3-(2ξ-benzoyl-3-oxobutyl)7β-(2-tienylacetamido)ceph - 3 - em-4 - carboxylic acid and 7β-(D-2-amino - 2 - phenylacetamido)-3-(2ξ-t-butoxycarbonyl-3-oxobutyl)ceph-3-em-4-carboxylic acid, trifluoroacetic acid salt.

We have also been able to prepare compounds of the general formula:

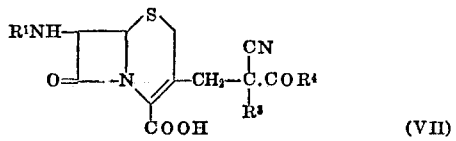

(VII)

(wherein $R^1$ is a carboxylic acyl group; $R^3$ is hydrogen, lower alkyl, phenyl, substituted phenyl, lower alkoxycarbonyl, mono- or di-aryl lower alkoxycarbonyl, lower alkylcarbonyl, aryl lower alkyl or $C_5$ or $C_6$ cycloalkyl and $R^4$ is hydrogen, lower alkyl, $C_1$–$C_8$ alkoxy, phenyl, substituted phenyl, aryl lower alkyl or $C_5$ or $C_6$ cycloalkyl) and nontoxic derivatives thereof. New cyano compounds that we have prepared are 3-(2ξ-cyano-2ξ-methoxycarbonylethyl) 7β-(2-thienylacetamido)ceph-3-em-4-carboxylic acid and 7β-(D-2-amino-2-phenyl-acetamido)-3-(2ξ-cyano-2ξ-methoxycarbonylethyl)ceph-3 - em - 4-carboxylic acid, trifluoroacetic acid salt.

Where at any stage the product is a 7β-acylamido compound not having the desired acyl group, the 7β-acylamido compound may be N-deacylated to yield the corresponding 7β-amino compound and the latter acylated with an appropriate acylating reagent.

Suitable methods of N-deacylating cephalosporin derivatives having 7β-acylamido groups are described in British Pats. Nos. 1,041,985 and 1,119,806; Belgian Pat. No. 719,712 and in South African Patent Specifications Nos. 68/5048 and 68/5327. Another method of N-deacylation which may be used is acid catalysis. For example, N-deformylation of a 7β-formamido group may be effected with a mineral acid at a temperature of minus 15° to +100° C., preferably +15 to 40° C. A convenient reagent for the N-deformylation is concentrated hydrochloric acid in methanol, dioxan or tetrahydrofuran. Alternatively N-deformylation may be effected with the aid of a Lewis acid in a lower alkanol or a lower alkane diol, under substantially anhydrous conditions. N-deformylation under such substantially anhydrous conditions may be effected at a temperature of from −40° to +100° C. advantageous at from −20° to +70° C.

The new compounds of the invention may be formulated for administration in any convenient way, by analogy with other antibiotics and the invention therefore includes within its scope a pharmaceutical composition comprising said new compound or a non-toxic derivative e.g. salt thereof (as herein defined) adapted for use in human or veterinary medicine. Such compositions may be presented for use in conventional manner with the aid of any necessary pharmaceutical carriers or excipients. The compositions may contain from 0.1% upwards, preferably from 10–60% of the active material, depending on the method of administration. Where the compositions comprise dosage units, each unit will preferably contain 50–500 mg. of the active ingredient. The dosage as employed for adult human treatment will preferably range from 100–3000 mg. for instance 1500 mg. per day, depending on the route and frequency of administration.

The new compounds of the invention may be administered in combination with other therapeutic agents such as antibiotics, for example other cephalosporins, the penicillins or tetracyclines.

In the following Examples which illustrate the invention:

Petroleum spirit was the fraction b.p. 60 to 80°. Methylene chloride was dried on Woelm grade I basic alumina. Chloroform was dried on coarse self-indicating silica gel (British Drug Houses). Solutions were normally dried with magnesium sulphate and evaporated at water-pump pressure. Column chromatography was carried out on Merck Kieselgel (0.05–0.2 mm.) The NMR spectra were determined at 60 MHz. unless otherwise stated. Signs of the coupling constants have not been determined. The following were the conditions for thin-layer chromatography (TLC) and paper chromatography.

*System A* is descending n-propanol:water=7:3 on Whatman No. 1 paper at room temperature.

*System B* is n-butanol:ethanol:water=4:1:5, equilibrated at room temperature. Descending manner with upper phase as developer in equilibrium with lower phase. Whatman No. 1 paper buffered to pH 6.0 with 0.05M-sodium dihydrogen phosphate.

*System C* is ethyl acetate:*n*-butanol:0.1M-sodium acetate (pH 5.0), equilibrated at 38°. No. 1 Whatman paper buffered to pH 5.0 with 0.1M-sodium acetate.

*System D* Merck $GF_{254+366}$ plates, with the upper phase of Solvent Mixture B for development.

*System E* On the plates of System D, with benzene: ethyl acetate=5:1 for development.

*System F* As System E, but with benzene:ethyl acetate=1:1 as solvent.

These abbreviations are used for the appearances of the spots: s, strong; m, medium; f, faint, v, very.

$R_T$ represents the $R_F$ value divided by that of 7β-(2-thienylacetamido)cephalosporanic acid.

The conditions for electrophoresis are those described by Crocker et al., *J. Chem. Soc.*, 1965, 5015.

EXAMPLE 1

(a) Tetra-n-butylammonium Salt of Ethyl Acetoacetate (i) A solution of ethyl acetoacetate (5.0 g., 0.038 mole) in freshly purified (passed through Woelm basic alumina, activity 1) chloroform 40 ml.) was stirred with tetra-n-butylammonium hydroxide (24 ml. of 40% aqueous solution diluted to 40 ml., 0.037 mole) for 5 minutes at 28°. The lower layer was dried, and evaporated to give a pale-brown oil (10.0 g., 85%); $\lambda\lambda_{max.}$ (ethanol) 268.5 nm.

($E_{1cm.}^{1\%}$ 275) and 370 nm. ($E_{1cm.}^{1\%}$ 5.7).

(ii) Ethyl acetoacetate (5.0 g., 0.038 mole) was stirred with tetra-*n*-butylammonium hydroxide (20 ml. of 40% aqueous solution diluted to 35 ml.) for 5 minutes at 27°. Chloroform (35 ml.) was added and separated after shaking. The chloroform layer was dried and evaporated to give an oil (11.0 g., ca. 100%), $\lambda\lambda_{max.}$ (ethanol) 269 nm.

($E_{1cm.}^{1\%}$ 210) and 370 nm. ($E_{1cm.}^{1\%}$ 1.7)

(Found: Cl 5.0%).

(b) Diphenylmethyl 3-(2-ethoxycarbonyl-3-oxobutyl)-7β-(2-thienylacetamido)ceph-3-em-4-carboxylate A solution of diphenylmethyl 3-iodomethyl - 7β - (2-thienylacetamido)ceph - 3 - em - 4 - carboxylate (626 mg., 1 mmole) in chloroform (3 ml.) was stirred with the tetra-*n*-butylammonium salt of ethyl acetoacetate (1.235 g., 3 mmoles) in chloroform (1 ml.) for 15 minutes. The product was evaporated, dissolved in benzene and chromatographed on silica (Merck Kieselgel 0.05 to 0.2 mm., 20 g.) to give a powder ($R_f$ 0.5, system E), m.p. 57 to 62° (decomp.), $[\alpha]_D^{20}$ −3° (c 0.9 CHCl$_3$).

EXAMPLE 2

(a) Tetra-n-butylammonium Salt of Diphenylmethyl Acetoacetate

A solution of diphenylmethyl acetoacetate (5.8 g., 22 mmole) in chloroform (25 ml.) was added to a solution of tetra *n*-butylammonium hydroxide (15 ml. of 40% aqueous solution, diluted to 25 ml.; 23 mmole) at 22°. The mixture was shaken and the lower layer was separated, dried, and evaporated to an oil (14.25 g.). Fractional crystallisation from ethyl acetate gave needles (520 mg.), m.p. 78 to 106° $\lambda_{max.}$ (ethanol) 268 nm. (ε 2,580).

(b) Diphenylmethyl 3-(2 - diphenylmethoxycarbonyl - 3-oxobutyl) - 7β - (2-thienylacetamido)ceph - 2 - en-4α-carboxylate A solution of diphenylmethyl 3-iodomethyl - 7β - (2-thienylacetamido)ceph - 3 - em - 4 - carboxylate (192 mg.) in benzene (3 ml.) was stirred with a solution of the tetra-*n*-butylammonium salt of diphenylmethyl acetoacetate (300 mg.) in benzene (3 ml.). After 1 hour the reaction mixture was chromatographed on Merck Kieselgel (0.02 to 0.5 mm.) (10 g.). The main fraction ($R_f$ 0.6, system E) was obtained as a precipitated pale yellow powder (60 mg.), m.p. 85 to 103° (decomp.), $\lambda_{max.}$ (ethanol) 240 nm. ($E_{1cm.}^{1\%}$ 191)

(no clear shoulder at ca 260 nm.).

EXAMPLE 3

(a) Tetra-n-butylammonium Salt of Methyl Cyanoacetate

A solution of methyl cyanoacetate (10.0 g., 0.1 mole) in chloroform (100 ml.) was stirred for 5 minutes at 25° with a solution of tetra-*n*-butylammonium hydroxide (65 ml. of 40% aqueous solution diluted to 100 ml.). The lower layer was dried and evaporated to give a semicrystalline mass (30 g.), which still contained some chloroform; it was recrystallised from ethyl acetate to give *the salt* as needles (5.93 g., 17%) and an oil (15.7 g.) approx. 46%. The crystalline sample had m.p. 80 to 82° (lit. 83°), $\lambda_{max.}$ (ethanol) 247.5 nm. (ε 1,630).

(b) Diphenylmethyl 3 - (2ξ - Cyano - 2ξ - methoxycarbonylethyl) - 7β - (2 - thienylacetamido) ceph-3-em-4-carboxylate A solution of diphenylmethyl 3-iodomethyl-7β-(2-thienylacetamido)ceph-3-em-4-carboxylate (1.788 g., 2.8 mmole) in ethanol-free dry chloroform (5 ml.) was added during 6 minutes to a stirred solution of the tetra-*n*-butylammonium salt of methyl cyanoacetate (1.93 g., 5.65 mmole, 2 equiv.) and methyl cyanoacetate (1.0 g., excess) in chloroform (5 ml.) at 0°. After 5 minutes, the red solution was stirred with ethyl acetate (10 ml.)

and 2N-hydrochloric acid (10 ml.). The pale-orange organic layer was washed, dried, and evaporated to give a gum (3.883 g.), which was chromatographed on Merck Kieselgel (60 g.). Benzene containing 15% ethyl acetate eluted a gum (1.03 g.) which was dissolved in ethyl acetate and added to petroleum spirit to give a white powder (848 mg., 50%), m.p. 73 to 80, $[\alpha]_D^{22} -26°$ (c 0.95, chloroform), no $\lambda_{max.}$ (ethanol) but inflexions at 235 nm. ($\epsilon$ 13,300), and 260 nm. ($\epsilon$ 7,450).

(c) 3-(2$\epsilon$-Cyano-2$\epsilon$-methoxycarbonylethyl)-7$\beta$-(2-thienylacetamido)ceph-3-em-4-carboxylic acid The diester (1.245 g., 2.08 mmole) was dissolved in anisole (1.4 ml.) and trifluoroacetic acid (6 ml.). After 5 minutes at 25°, the solution was evaporated at 25°/1 mm. A little ethyl acetate was added and evaporated, and the resultant pale-yellow solid was partitioned between ethyl acetate and sodium bicarbonate solution. The aqueous layer was acidified to pH 2.0 and extracted into ethyl acetate which was washed, dried, and evaporated to give a foam (772 mg.). The foam was dissolved in ethyl acetate and added to a large volume of petroleum spirit to give the *cyano mono-ester* as a white powder, m.p. 85 to 95° (decomp.), $[\alpha]_D^{22} +21°$ (c 0.84, chloroform), $\lambda_{max.}$ (0.1M pH 6-phosphate) 236 nm. ($\epsilon$ 13,800), inflexion at 260 nm. ($\epsilon$ 8,600), $\nu_{max.}$ (Nujol) 3500 ($H_2O$), 3300 (NH), 2250 (C≡N), 1780 ($\beta$-lactam), 1750 ($CO_2R$), 1720 and 2600 ($CO_2H$), and 1670 and 1530 cm.$^{-1}$ (CONH), $\tau$ (100 MHz.; $D_2O$ with $NaHCO_3$) 2.58 to 2.90 (3-proton multiplet; 2-thienyl), 4.42 (1-proton, 2 doublets, J 5 Hz., aprox. 0.5 Hz. apart; $C_7$-H), 4.90 (1 proton, 2 doublets, J 5 Hz., approx. 0.5 Hz. apart; $C_6$-H), 6.13 (2-proton singlet; $CH_2CO$), 6.22 (3-proton singlet; $CO_2Me$), 6.3 to 7.3 (4-proton multiplet, includes AB-quartet, J 14 Hz., at 6.73 and 7.16; $C_3$-$CH_2$ and $C_2$-$CH_2$) (Found: C, 48.6; H, 3.9; N, 9.1; S, 14.2 $C_{18}H_{17}N_3O_6S_2 \cdot 0.5H_2O$ (435.47) requires C, 48.75; H, 4.1; N, 9.45; S, 14.4%), $R_f$ 0.15 (s) (System B, 0.1 mg. loading), 0.45 (s) (System C, 0.1 mg. loading), 0.3 (s) (System D, 0.1 mg. loading). A trace impurity ($R_f$ 0.05, 0.05, 0.2 in Systems B, C, and D respectively) was just detectable; it had the same $R_f$ as the bis-compound (Example 5b).

The compound displayed the following activity as evidenced by the serial dilution technique ($\gamma$/ml.); *Staph aureus* 604 (2.5), *Staph aureus* 663 (0.6), *Staph aureus* 3452 (8), *S. typhimurium* 804 (62), *Pr. mirabilis* 431 (<0.5.) *H. influenza* 1184 (31) Mouse protection test ($ED_{50}$ mg./kg.) *Staph aureus* 11127 (~12), $\beta$-lactamase stability 0.7.

EXAMPLE 4

(a) Tetra-n-Butylammonium Salt of Ethyl Benzoylacetate

Ethyl benzoylacetate (7.7 g., 0.040 mole) was shaken with tetra-n-butylammonium hydroxide (25 ml. of 40% aqueous solution, 0.039 mole, diluted to 40 ml.). Chloroform (40 ml.) was added and the two layers were shaken. The lower layer was divided onto two parts A and B. One was washed with water, then dried and evaporated to give a red semi-crystalline mass (A, 7.2 g.). The other half of the chloroform solution was dried and evaporated to give an orange crystalline mass (B, 8.3 g.).

Sample (A) was recrystallised from ethanol to give *the salt* as needles, m.p. 160 to 162.5° (decomp.), $\lambda\lambda_{max.}$ (ethanol) 237.5 nm. ($\epsilon$ 29,200) and 301 nm. ($\epsilon$ 24,350).

(b) Diphenylmethyl 3 - (2$\xi$ - Benzoyl-2$\xi$-ethoxy-carbonylethyl)-7$\beta$-(2-thienylacetamido)ceph-3-em-4-carboxylate A solution of the tetrabutylammonium salt of ethyl benzoylacetate (2.614 g., product B above, 6.05 mmole, 1.7 equiv.) in chloroform (5 ml.) was stirred with a solution of diphenylmethyl 3-iodomethyl-7$\beta$-(2-thienyl-acetamido)ceph-3-em-4-carboxylate (2.157 g., 3.4 mmole) in chloroform (10 ml.) at 0° for 5 minutes. Ethyl acetate (80 ml.) and 2N-hydrochloric acid (20 ml.) were added. The organic layer was washed successsively with water, sodium thiosulphate solution, brine, and was then dried, and evaporated. The gum (4.0 g.) was chromatographed on Merck Kieselgel (0.05 to 0.2 mm., 80 g.), eluting with benzene containing increasing amounts of ethyl acetate to give two main fractions, firstly unreacted iodoester (870 mg.), and secondly the coupled product (564 mg., 38%), m.p. 70 to 78°, $[\alpha]_D^{20} -21.8°$ (c 1.1, $CHCl_3$), $\lambda_{max.}$ (ethanol) 242 nm. ($\epsilon$ 21,100), at 260 nm. no maximum ($\epsilon$ 11,500).

With 2.1 equivalents of salt B (see above) the yield of the title-compound was raised from 38% to 55% (Equivalents of salt B were based on its being pure tetra-n-butylammonium salt of ethyl benzoylacetate).

(c) 3-(2$\xi$-Benzoyl-2$\xi$-ethoxycarbonylethyl)-7$\beta$-(2-thienylacetamido)ceph-3-em-4-carboxylic acid A solution of diphenylmethyl 3-(2$\xi$-benzoyl-2$\xi$-ethoxycarbonylethyl)-7$\beta$-(2-thienylacetamido)ceph-3-em-4- carboxylate (2.299 g.) in anisole (3 ml.) was reacted with trifluoroacetic acid (10 ml.) for 2 minutes at 25°. The solution was then evaporated at 25°/2 mm. to give an oil which was dissolved in ethyl acetate and re-evaporated. The gum was partitioned between ethyl acetate and water at pH 8, and the aqueous layer was acidified to pH 2 and extracted into ethyl acetate, which was washed, dried, and evaporated to give a foam (1.7 g.). The foam was dissolved in ethyl acetate which was added to a large volume of petroleum spirit to give white curds of the *acid* (1.503 g., 86%), m.p. 79 to 89° (decomp.), $[\alpha]_D^{22} +29°$ (c 1.01, $CHCl_3$), $\lambda_{max.}$ (0.2M pH 6-phosphate) 245 nm. ($\epsilon$ 21,000), inflexion at 260 nm. ($\epsilon$ 16,600).

(d) 3-Benzoylethyl-7$\beta$-(2-thienylacetamido)ceph-3-em-4-carboxylic acid

A solution of 3-(2$\xi$-benzoyl-2$\xi$-ethoxycarbonylethyl)-7$\beta$-(2-thienylacetamido)ceph-3-em-4-carboxylic acid (98 mg., 0.19 mmole) in water (2 ml.) containing potassium carbonate (54 mg., 0.39 mmole, 4 equiv.) was kept at 52° for 6.5 hours, then at 37° for 16 hours. The solution was washed with ethyl acetate, acidified, and extracted into ethyl acetate, which was washed, dried and evaporated. The gum was dissolved in ethyl acetate, which was added to petroleum spirit to give a powder (43 mg., 50%), $R_f$ 0.50 (m), 0.9 (m) (System C, 0.1 mg. loading). The *title compound* had $R_f$ 0.5 (s), 0.2 (f), 0.1 (f) under the same conditions.

EXAMPLE 5

(a) Methyl 2-Cyano-2,2-bis[4-diphenylmethoxycarbonyl 7$\beta$-(2-thienylacetamido)ceph - 3 - em - 3 - yl-methyl]-acetate A solution of the tetra-*n*-butylammonium salt of methyl cyanoacetate (347 mg., 1.02 mmole, 1.07 equiv.) in dry, ethanol-free chloroform (5 ml.) was added to a stirred solution of diphenylmethyl 3-iodomethyl-1$\beta$-(2-thienylacetamido)ceph-3-em-4-carboxylate (604 mg., 0.95 mmole) in chloroform (5 ml.) at 0°. After 1 hour, the mixture was poured into ethyl acetate and 2N-hydrochloric acid. The organic layer was washed, evaporated, and dried to give a foam (800 mg.), which was chromatographed on Merck Kieselgel (20 g.). Benzene containing 15% ethyl acetate eluted the mono-alkylated compound (Example 11, 60 mg., approx. 10%,).

Benzene containing 20% ethyl acetate eluted a gum (483 mg., 85%), which crystallised from benzene containing ethanol to give the *title compound* as prisms (260 mg., 45%), m.p. 135 to 142°, $[\alpha]_D^{22} +21°$ (c 1.34, $CHCl_3$), $\lambda_{max.}$ (ethanol), 265 nm. ('$\epsilon$ 14,400), inflexion at 235 nm. ($\epsilon$ 26,300).

(b) Methyl 2-Cyano-2,2-bis[4-carboxy-7$\beta$-(2-thienyl-acetamido)ceph-3-em-3-yl-methyl]acetate The ester, 1.209 g., 1.56 mmole) was dissolved in anisole (1.2 ml.) and trifluoroacetic acid (5 ml.). After 5 minutes at 25°, the solution was evaporated at 25°/1 mm. A little ethyl acetate was added and the suspension was again evaporated. The pale-yellow solid was dissolved in sodium bicarbonate and washed with ethyl acetate. The aqueous phase was acidified to pH 2.0, and extracted into ethyl acetate, which was washed, dried, and evaporated to give a foam (610 mg.). The foam was dissolved in ethyl acetate and filtered, and added to a large volume of petroleum spirit to give the *diacid* as a white powder (540 mg., 60%), m.p. 130 to 155° (decomp.), $[\alpha]_D^{20}$ +121° (c 1.16, chloroform containing 5% dimethylsulphoxide), $\lambda_{max.}$ (0.1M pH 6-phosphate) 236.5 nm. ($\epsilon$ 25,800), inflexion at 260 nm. ($\epsilon$ 16,900).

EXAMPLE 6

(a) Tetra-n-butylammonium Phenoxide

A solution of phenol (4.025 g., 42.5 mmole) in dry methylene chloride (50 ml.) was shaken with tetra-*n*-butylammonium hydroxide (27.5 ml. of 40% aqueous solution diluted to 40 ml., 42.5 mmole, 1 equiv.). The organic phase was dried with magnesium sulphate and evaporated finally at 1 mm. to give a waxy crystalline mass of the crude *phenoxide* (12.8 g., 100%), $\lambda_{max.}$ (ETOH) 272.5 nm.

($E_{1cm}^{1\%}$ 69).

The crude preparation was crystallised from ethyl acetate to give prisms (853 mg.) and a filtrate (10.1 g.). The crystalline crop had m.p. 95 to 120°, $\lambda_{max.}$ (ethanol) 269 nm.

($E_{1cm}^{1\%}$ 65).

Both the crystalline and the crude salts were reacted (as described in later examples) with esters of 3-iodomethyl-7β-(2 - thienylacetamido)ceph-3-em-4-carboxylic acid.

(b) Reaction with Tetra-n-butylammonium Phenoxide. Diphenylmethyl 3-(4-Hydroxybenzyl) - 7β-(2-thienylacetamido)ceph-3-em-4-carboxylate and its Δ²-Isomer (A) A solution of diphenylmethyl 3-iodomethyl-7β-(2-thienylacetamido)ceph-3-em-4-carboxylate (930 mg., 1.47 mmole) in dry ethanol-free chloroform (5 ml.) was stirred at 0° with crude tetra-*n*-butylammonium phenoxide (2.64 g., 7.9 mmole, 5.3 equiv.) in chloroform (5 ml.), which was added during 10 minutes. After 5 more minutes, TLC (System E) showed complete consumption of starting ester; after 30 minutes, the reaction mixture was poured into ethyl acetate (50 ml.) and 2N-hydrochloric acid (10 ml.). The organic layer was washed, dried, evaporated, then dissolved in benzene and chromatographed on a column of Merck Kieselgel (40 g.). The material loaded on the column has the following chromatographic behaviour: $R_f$ 0.65 (f), 0.6 (f), 0.35 (mf), 0.3 (f), 0.2 (mf), 0.0 (s), (System E). Most fractions eluted from the column were mixtures, but two were purer. Fraction 1, eluted with benzene containing 15% ethyl acetate, was obtained as a precipitated powder (80 mg., 9%). and was identified as the result of carbon-to-carbon coupling in the p-position, i.e. *the title hydroxybenzyl ester*, m.p. 120 to 136° (decomp.), $[\alpha]_D^{20}$ +69° (c 0.7, tetrahydrofuran), no UV maxima (ethanol), but inflexions at 234 nm.

($E_{1cm}^{1\%}$ 291) and 263 nm. ($E_{1cm}^{1\%}$ 133).

(B) A solution of diphenylmethyl 3-iodomethyl-7β-(2-thienylacetamido)ceph-3-em-4-carboxylate (1.502 g., 2.38 mmole) in ethanol-free, dry chloroform (7 ml.) was stirred with crude tetra-*n*-butylammonium phenoxide (3.75 g., 11.3 mmole, 4.7 equiv.) in chloroform (10 ml.), which was added over 105 minutes. After a further 15 minutes, the red solution was poured into ethyl acetate and 2N-hydrochloric acid. The organic layer was washed, dried and evaporated to a black oil (2.515 g.) which was chromatographed on Merck Kieselgel (60 g.) taking 65 fractions. Seven combinations of fractions were obtained, none of which was pure. One (eluted with benzene containing 15% ethyl acetate) (160 mg., 11%) resembled fraction 1 of the previous example (A). A fraction eluted later (240 mg.), $[\alpha]_D^{21}$ +205° (c 0.9, CHCl₃), (chloroform) no maxima nor inflexions (ethanol)

($E_{1cm}^{1\%}$ 100 at 262 nm.).

This product was shown to be diphenylmethyl 3-(4-hydroxybenzyl)-7-β - (2-thienylacetamido)ceph - 2-em-4α-carboxylate.

(C) A solution of the crystalline phenoxide (105 mg., 0.32 mmole, 2 equiv.) in ethanol-free chloroform, (0.5 ml.) was added to a solution of diphenylmethyl 3-iodomethyl-7β-(2-thienylacetamido)ceph-3-em - 4-carboxylate (102 mg., 0.16 mmole) in chloroform (0.5 ml.) and stirred at 0° for 1.75 hours. The solution was then poured into ethyl acetate and 2N-hydrochloric acid and the organic layer was washed, dried, partially evaporated and added to petroleum spirit to give curds (73 mg.), $[\alpha]_D^{22}$ +187° (c 0.9, chloroform). The product was similar to the Δ²-isomer in the previous example (B).

EXAMPLE 7

(a) Tetra-n-butylammonium Thio-n-propoxide

A solution of tetra-*n*-butylammonium hydroxide (25 ml. of a 40% aqueous solution diluted to 40 ml., 39 mmole) was added in portions with shaking to a solution of *n*-propanethiol (3.64 ml., 3.04 g., 40 mmole) in dry methylene chloride. The organic layer was separated, dried, and evaporated to give the *crude salt* as a slushy oil (8.475 g.) smelling of propanethiol.

(b) Diphenylmethyl 3-n-Propylthiomethyl-7β-(2-thienylacetamido)ceph-3-em-4-carboxylate A solution of diphenylmethyl 3-iodomethyl-7β-(2-thienylacetamido)ceph-3-em-4-carboxylate (95 mg., 0.15 mmole) in ethanol-free dry chloroform (1 ml.) was stirred at 0° with a solution of crude tetra-*n*-butylammonium thiopropoxide (103 mg., ca 0.3 mole) in chloroform (1 ml.). After 90 minutes, the red solution was poured into ethyl acetate and 2N-hydrochloric acid. The organic layer was washed, dried and chromatographed on Merck Kieselgel (2 g.). Benzene:ethyl acetate (5:1) eluted an oil which was dissolved in ethyl acetate and added to petroleum spirit to give the thio-ether as a pale yellow powder (15 mg.). The product had the same $R_f$ (0.7 (s), System E) as an authenic sample of diphenylmethyl 3-*n*-propylthiomethyl-7β - (2-thienylacetamido) ceph-3-em-4-carboxylate.

EXAMPLE 8

Diphenylmethyl 3-Chloromethyl-7β-(2-thienylacetamido) ceph-3-em-4-carboxylate

A solution of diphenylmethyl 3 - iodomethyl-7β-(2-thienylacetamido)ceph-3-em-4-carboxylate (200 mg., 0.32 mmole) in dry chloroform (2 ml.) at 28° was treated with a solution of tetra-*n*-butylammonium chloride (134 mg., 0.48 mmole, 1.5 equiv.) in chloroform (1 ml.). There was an immediate reaction (TLC, System E). The solution was evaporated after 15 minutes, ethyl acetate was added, and fine plates (70 mg.) of tetra-*n*-butylammonium iodide were filtered off. The filtrate was chromatographed on Merck Kieselgel. Benzene:ethyl acetate (9:1) eluted the *chloromethyl ester* (75 mg., 45%).

EXAMPLE 9

(a) Tetra-*n*-Butylammonium Acetate

Tetra-*n*-butylammonium hydroxide (25 ml. of 40% solution diluted to 40 ml., 39 mmole) was shaken with a solution of acetic acid (2.28 ml., 2.4 g., 40 mmole) in methylene chloride (40 ml.). The lower layer was separated, dried, and evaporated to give a crystalline mass (1.2 g.). The aqueous layer was repeatedly extracted with methylene chloride to give a combined extract (3.55 g.). The aqueous layer was freeze-dried to give a viscous oil (6.38 g.).

(b) Diphenylmethyl 3-Acetoxymethyl-7β-(2-thienylacetamido)ceph-2-em-4α-carboxylate A solution of tetra-n-butylammonium acetate (196 mg., 0.64 mmole, 2 equiv.) in ethanol-free dry chloroform (1 ml.) was added to diphenylmethyl 3-iodomethyl-7β-(2 - thienylacetamido)ceph-3-em-4-carboxylate (209 mg., 0.32 mmole) in chloroform (1 ml.) at 0°. The solution was stirred for 1.75 hours at 0°, then poured into 2N-hydrochloric acid and ethyl acetate. The organic layer was washed, dried and partially evaporated, then added to a large volume of petroleum spirit to give the *acetate* (104 mg., 57%), $[\alpha]_D^{22}$ +209° (c 0.83, chloroform).

EXAMPLE 10

(a) Tetra-n-butylammonium Salt of Benzoylacetone

A solution of benzoylacetone (7.35 g., 46.5 mmole, 1.02 equiv.) in dry methylene chloride (50 ml.) was shaken with a solution of tetra-n-butylammonium hydroxide (50 ml.) of 23.5% aqueous solution (45.3 mmole), which was added in 3 portions. The organic layer was dried over magnesium sulphate and evaporated to give a crystalline mass (18 g.), which was recrystallised from ethyl acetate (35 ml.) to give the *title compound* complexed with magnesium and benzoylacetone (5.73 g.), m.p. 134 to 158° (decomp.) λλ$_{max.}$ (ethanol) 241.5 nm. ($E_{1 cm}^{1\%}$ 279), 316.5 nm. ($E_{1 cm}^{1\%}$ 575).

(b) Diphenylmethyl 3-(2ξ-Benzoyl-3-oxobutyl)-7β-(2-thienylacetamido)ceph-3-em-4-carboxylate A solution of diphenylmethyl - 3 - iodomethyl-7β-(2-thienylacetamido)ceph-3-em-4-carboxylate (2.979 g., 4.72 mmole) in ethanol-free chloroform (20 ml.) at 0° was added to a stirred solution of the tetra-n-butylammonium salt of benzoylacetone (4.275 g., 5.3 mmole, approx. 1.1 equiv. assuming a molecular weight of approx. 800) at 0 to 5° during 2 minutes. The red reaction mixture was stirred at 0° for 50 minutes, then poured into ethyl acetate (160 ml.) and 2N-hydrochloric acid (40 ml.). The organic layer was washed, dried, and evaporated to give an oil (6.196 g.) which was chromatographed on Merck Kieselgel (140 g.). Benzene containing 15% ethyl acetate eluted the *diketo-compound* (2.16 g., 57%), m.p. 77 to 83° (decomp.), $[\alpha]_D^{20}$ −32° (c 0.78, CHCl$_3$), R$_f$ 0.45 (s), 0.3 (vf), 0.35 (vvf), (System E). Part (1.5 g.) of this product was rechromatographed to give a slightly purer specimen, m.p. 75 to 83° (decomp.), $[\alpha]_D^{20}$ −29° (c 0.7, CHCl$_3$), λ$_{max.}$ (ethanol) 243 nm. (ε 18,600).

(c) 3-(2ξ-Benzoyl-3-oxobutyl)-7β-(2-thienylactetamido)ceph-3-em-4-carboxylic Acid A solution of diphenylmethyl 3-(2ξ-benzoyl-3-oxobutyl) - 7β-(2-thienylacetamido)ceph-3-em-4-carboxylate (702 mg.) in anisole (0.7 ml.) was reacted with trifluoroacetic acid (2.1 ml.) at 25° for 2 minutes. The solution was evaporated at 25°/0.3 mm., then triturated with ethyl acetate which was evaporated to give an oil. The oil was partitioned between water and ethyl acetate at pH 8. The aqueous layer was then acidifed and extracted into ethyl acetate, which was washed, dried, and evaporated to give a foam (495 mg.). The foam was dissolved in ethyl acetate and added to a large volume of petroleum spirit to give the *acid* (84%), m.p. 84 to 92° (decomp.), $[\alpha]_D^{20}$ +16.9° (c 0.945, CHCl$_3$) λ$_{max.}$ (0.1M pH 6-phosphate) 244 nm. (ε 19,500), at 260 nm. (ε 15,900), ν$_{max.}$ (CHBr$_3$) 3415 (NH), 1780 (β-lactam), 1722 and 2650 (CO$_2$H), 1680 and 1516 cm.$^{-1}$ (CONH), τ (100 MHz.; D$_2$O with NaHCO$_3$), 2.06 and 2.50 (5 protons, two doublets; COPh), 2.85 and 3.14 (3-proton multiplet; 2-thienyl), 4.5 and 4.55 (1 proton, 2 doublets, J 4 Hz; C$_7$-H), ca. 5.3 (partly obscured by H$_2$O peak; C$_6$-H and CH-COPh), 6.19 and 6.23 (2 protons, two singlets; CH$_2$CO), 6.5 to 7.5 (4-proton multiplets; C$_2$-CH$_2$ and C$_3$-CH$_2$), 7.77, 7.80 and 7.84 (3 protons, three singlets; COMe and possibly C=M-Ce of enol) (Found: C, 57.0; H, 4.5; N, 5.1; S, 12.7. C$_{24}$H$_{22}$N$_2$O$_6$S$_2$·0.5H$_2$O requires C, 57.0; H, 4.6; N, 5.5; S, 12.6%), R$_T$ 1.6 (System C, 0.2 mg. loading), R$_f$ 0.3 (System B, 0.2 mg. loading), 0.3 (vf), 0.5 (s), 0.6 (vf) (System D, 0.1 mg. loading). The compound displayed the following activity as evidenced by the serial dilution technique (γ/ml.); *Staph aureus* 604 (0.6), *Staph aureus* 663 (0.16), *Staph aureus* 3452 (1), *S. typhimurium* 804 (31), *Pr. mirabilis* 431 (62). H. influenza 1184 (62). Mouse protection (ED$_{50}$ mg./kg.) *Staph aureus* 11127 (50).

EXAMPLE 11

(a) Tetra-n-butylammonium Salt of t-Butyl Acetoacetate

A solution of t-butyl acetoacetate (6.2 g., 39 mmole) in dried methylene chloride (40 ml.) was shaken with a silution of tetra-n-butylammonium hydroxide (25 ml. of a 40% aqueous solution diluted to 40 ml., 38.5 mmole) added in portions. The lower layer was evaporated without drying to give an orange oil (13.54 g., 85%) λ$_{max.}$ (ethanol) 251 nm.

($E_{1 cm}^{1\%}$ 40).

(b) t-Butyl 7β-(N-t-Butoxycarbonyl-D-2 - aminophenylacetamido)-3-(2ξ-butoxycarbonyl-3-oxobutyl)ceph - 3-em-4-carboxylate A solution of t-butyl 7β-(N-t-butoxycarbonyl-D-2-aminophenylacetamido) - 3-iodomethylceph-3-em-4-carboxylate (641 mg., 1.01 mmole) in ethanol-free chloroform (5 ml.) was stirred with the tetra-n-butylammonium salt of t-butyl acetoacetate (852 mg., 2.1 mmole, 2.1 equiv.) in chloroform (5 ml.) at 0° for 60 minutes. Then the solution was poured into ethyl acetate and 2N-hydrochloric acid. The organic layer was washed and dried, to give an oil (1.29 g.), R$_f$ 0.7 (f), 0.5 (vf), 0.35 (s), 0.15 (mf), and 0.0 (s), which was chromatographed on Merck Kieselgel (40 g.). Benzene containing 15% ethyl acetate eluted the *keto-ester* (340 mg., 50%), which crystallised from petroleum spirit-ethyl acetate (20:1) as prisms, m.p. 77 to 95° (decomp.), $[\alpha]_D^{22}$ +5° (c 0.8, chloroform), λ$_{max.}$ (ethanol) 260 nm. (ε 6,700).

(ci) 7β-(D-2-Aminophenylacetamido)-3-(2ξ - t - butoxycarbonyl-3-oxobutyl)ceph-3 - em - 4 - carboxylic Acid, Trifluoroacetic Acid Salt A solution of t-butyl 7β-(n-t-butoxycarbonyl-D-2-aminophenylacetamido) -3-(2ξ-t-butoxycarbonyl-3-oxobutyl) ceph-3-em-4-carboxylate (515 mg., 0.78 mmole) in anisole (0.5 ml.) was reacted with trifluoroacetic acid (1.5 ml.) at 25° for 5 minutes. The solution was evaporated at 25°/ 1 mm. to give a foam which was washed with ether to give a pale-yellow solid (310 mg., 65%), insoluble in water. The solid was stirred with water (50 ml.) containing trifluoroacetic acid (4 ml.); the solution was filtered, rotary-evaporated, then freeze-dried to give the *trifluoroacetic acid salt* as a pale-yellow solid, (196 mg., 43%), decomposed at 125° without melting $[\alpha]_D^{22}$ +64° (c 0.71, H$_2$O), λ$_{max.}$ (0.1M pH 6-phosphate 261 nm. (ε 6,850), ν$_{max.}$ (Nujol) 3500 (H$_2$O), 2650 (NH$_3^+$ and CO$_2$H), 1770 (β-lactam), 1710 (CO$_2$R) 1690 (COMe), 1680 (F$_3$CO$_2^-$ and CONH), and 1540 cm.$^{-1}$ (CONH), τ (100 MHz.; D$_2$O with F$_3$CCO$_2$H) 2.46 (5 proton singlet; Ph), 4.36 (approx. 1-proton doublet, J 4 Hz.; C$_7$-H), 4.75 (approx. 1-proton singlet; Ph-CH), 4.94 (approx. 1-proton doublet, J 4 Hz.; C$_6$-H) 6.54 and 6.84 (2-protons, probably two overlapping AB-quartets, J 18 Hz.; C$_2$-CH$_2$), 7.25 (2-proton broad singlet; C$_3$-CH$_2$), 7.74 and 7.82 (3 protons, two singlets; COMe), 8.5 and 8.55 (approx. 1 proton, 2 singlets; probably caused by approx. 5 to 10% of a compound containing the —NH—CO$_2$Bu$^t$ group) and 8.57 (9-proton singlet CMe$_3$) (Found: C, 47.7; H, 4.7; F, 9.4; N, 6.8; S, 5.2; $C_{26}H_{30}F_3N_9S$ (617.59) requires C, 50.5; H, 4.9; F, 9.2; N, 6.8; S, 5.2%), $R_f$ 0.05 (s) 0.15 (mf) System B, 0.2 mg. loading), 0.05 (s) 0.9 (f) (System C, 0.2 mg. loading). Electrophoresis at pH 1.9: the distances moved towards the cathode in 1 hour were 8 cm. (s), 0 cm. (mf), 9.7 cm. (vf); at pH 7.0 the distances moved were: to the cathode: 1.5 cm. (vf); to the anode: 0.6 cm. (s).

The compound displayed the following activity as evidenced by the serial dilution technique ($\gamma$/ml.); *Staph aureus* 604 (2), *Staph aureus* 663 (1.25), *Staph aureus* 3452 (4), *S. typhimurium* 804 (31), *Pr. mirabilis* 431 (62) *Pr. morganii* 235 (16), H. influenza 1184 (16).

(cii) 7β - (D - 2 - Amino - 2 - phenylacetamido) - 3 - (3-oxobutyl) ceph - 3 - em - 4 - carboxylic Acid, Trifluoroacetic Acid Salt A solution of *t*-butyl 7β - (N - *t* - butoxycarbonyl-D - 2 - amino - 2 - phenylacetamido) - 3 - (2ξ - *t* - butoxycarbonyl - 3 - oxobutyl)ceph - 3 - em - 4 - carboxylate (2.80 g., 4.25 mmole) in anisole (3 ml.) was reacted with trifluoroacetic acid (15 ml.) at 25° for 25 minutes. The solution was then evaporated at 35° and 2 mm. to give a foam, which was dissolved in ethyl acetate (20 ml.). The solution was re-evaporated, and the resulting foam in ethyl acetate (30 ml.) was extracted with aqueous trifluoroacetic acid (10% v./v., 4 x 125 ml.). The combined extracts were washed with ether (2 x 50 ml.), rotary-evaporated and freeze-dried to give the *trifluoroacetic acid salt* as a white foam (2.10 g. 94%) with spectral, chromatographic and physical properties similar to an authentic sample.

EXAMPLE 12

Reaction between the tetra-*n*-butylammonium Salt of Methyl Cyanoacetate and 3 - Chloromethyl - 7β - (2-thienylacetamido)ceph-2-em-4-carboxylic Acid A solution of the chloromethyl acid (98 mg., 0.26 mmole) in methylene chloride (1 ml.) was stirred with a solution of the tetra-*n*-butylammonium salt of methyl cyanoacetate (244 mg., 0.72 mmole, 2.7 equiv.) in methylene chloride (1 ml.) at 27° for 3 hours. Paper chromatography (System C) revealed a new faint spot, $R_f$ 0.45 3 - (2ξ - Cyano - 2ξ - methoxycarbonylethyl) - 7β-(2 - thienylacetamido) - ceph - 3 em - 4 - carboxylic acid had $R_f$ 0.45 under the same conditions.

EXAMPLE 13

(a) Tetra-*n*-Butylammonium Salt of Acetylacetone

Acetylacetone(0.8 g.) was added to a solution of tetra-*n*-butylammonium hydroxide (5 ml. of 40% aqueous solution diluted to 8 ml., 7.8 mmole, 0.97 equiv.) at 28°. After 5 minutes chloroform (8 ml.) was added, and the solution was shaken. The organic layer was dried and evaporated to give a crystalline mass (2.6 g.). This was crystallised from ethanol to give needles (980 mg.), no resonances at 6.7, 8.5 and 9.1 τ, evidently not a tetra-*n*-butylammonium salt. The filtrate was crystallised from ethyl acetate to give *the salt* as needles, m.p. 148 to 151° (decomp.) (lit. m.p. 155°), $\gamma_{max}$. (ethanol) 273 nm. (ε 9,500).

(b) Reaction between Diphenylmethyl 3-Iodomethyl-7β-(2-thienylacetamido)ceph-3-em-4-carboxylate and the Tetra-*n*-Butylammonium Salt of Acetylacetone A solution of diphenylmethyl 3 - iodomethyl - 7β - (2-thienylacetamido)ceph - 3 - em - 4 - carboxylate (50 mg., approx. 0.1 mmole) in chloroform (1 ml.) was stirred with a solution of the tetra-*n*-butylammonium salt of acetylacetone (45 mg., approx. 2 equivalents) in chloroform (1 ml.). After 5 minutes, TLC showed complete consumption of the iodo ester and two new products, $R_f$ 0.25 (m) and 0.1 (m). Diphenylmethyl 3 - (2ξ - acetyl-3 - oxobutyl) - 7β - (2 - thienylacetamido)ceph - 3 - em-4-carboxylate had $R_f$ 0.25 (s) under the same conditions. The material was identified by comparison with an authentic sample.

EXAMPLE 14

(a) Diphenylmethyl 7β - (N - *t* - Butoxycarbonyl - D - 2-amino - 2 - phenylacetamido) - 3 - (2ξ - cyano - 2ξ-methoxycarbonylethyl)ceph-3-em-4-carboxylate A solution of diphenylmethyl 7β - (N - *t* - butoxycarbonyl - D - 2 - amino - 2 - phenylacetamido) - 3 - iodomethylceph - 3 - em - 4 - carboxylate (3.71 g., 5.0 mmole) in dry methylene chloride (50 ml.) was added during 10 minutes to a stirred solution of the tetra - *n* - butylammonium salt of methyl cyanoacetate (3.41 g., 10.0 mmole) in dry methylene chloride (50 ml.) at —60°. The solution was stirred for a further 5 minutes at —60°, allowed to warm to 20° during 30 minutes, and then stirred 2N-hydrochloric acid (10 ml.). The organic layer was dried and evaporated to a foam (7.0 g.), which was chromatographed on Kieselgel (140 g.). Benzene containing 20% ethyl acetate eluted the *title compound* which was isolated as a foam (1.88 g., 53%), m.p. 85 to 103° (decomp.), $[\alpha]_D^{25}$—37° (*c* 0.94, chloroform), $\gamma_{max}$. (ethanol) 260 nm. (ε 7,200).

(b) 7β - (D - 2 - Amino - 2 - phenylacetamido) - 3 - (2ξ-cyano - 2ξ - methoxycarbonylethyl)ceph - 3 - em - 4-carboxylic Acid, Trifluoroacetic Acid Salt A solution of diphenylmethyl 7β-(N-t-butoxycarbonyl-D - 2-amino-2-phenylacetamido)-3-(2ξ-cyano-2ξ-methoxycarbonylethyl)ceph-3-em-4-carboxylate (820 mg., 1.15 mmole) in anisole (1 ml.) was reacted with trifluoroacetic acid (4 ml.) for 4 minutes at 25°. The solution was then evaporated at 40° and 2 mm. to give an oil which was dissolved in ethyl acetate (5 ml.). The solution was re-evaporated, and the resulting gum in ethyl acetate (10 ml.) was extracted with aqueous trifluoroacetic acid (8% v./v., 4× 25 ml.). The combined extracts were washed with ether (10 ml.), rotary-evaporated and freeze-dried to give the *trifluoroacetic acid salt* as a white foam (425 mg., 67%), m.p. 136 to 144° (decomp.), $[\alpha]_D^{25}$ +69° (*c* 0.79, dimethyl sulphoxide), $\lambda_{max}$. (0.1M pH 6 phosphate buffer) 261 nm. (ε 7,600), $\nu_{max}$. (Nujol) 3500 ($H_2O$), ca. 2600 ($NH_3^+$), 1760 (β-lactam), 1700 ($CO_2H$). 1670 ($CF_3CO_2^-$ and CONH), and 1530 cm.$^{-1}$ (CONH), τ (100 MHz., $D_2O$) 2.47 (5-proton singlet; Ph), 4.29 (1-proton doublet, J 5 Hz.; $C_7$–H), 4.76 (1-proton singlet; PhCH), 4.91 (1-proton doublet, J 5 Hz.; $C_6$–H), 6.24 (3-proton singlet; $CO_2 CH_3$), 6.39 and 6.71, 6.46 and 6.79 (2 protons total, two AB-quartets, J 18 Hz.; $C_2$–$CH_2$, two diastereoisomers), 6.82 and 6.86 (2 protons, two singlets; $C_3$–$CH_2$, two diastereoisomers). (Found: C, 45.7; H, 3.7; N, 9.6; S, 5.9; F, 10.3. $C_{22}H_{21}F_3N_4O_8S.H_2O$ requires C, 45.8; H, 4.0; N, 9.7; S, 5.5; F, 9.9%), $R_f$ 0.05 (System B), 0.1 (System C). Mobilities on electrophoresis, at pH 1.9 4 cm. towards the cathode, at pH 7.0 0.5 cm. towards the anode, in 45 minutes.

EXAMPLE 15

Diphenylmethyl 3-(2ξ-Cyano-2ξ-methoxycarbonylethyl)-7β-(thien-2-ylacetamido)ceph-3-em-4-carboxylate and Methyl 2 - Cyano - 2,2-bis[4-diphenylmethoxycarbonyl-7β-(thien-2-ylacetamido)ceph-3-em-3-ylmethyl]acetate A solution of methyl cyanoacetate (1 ml.) in methylene dichloride (20 ml.) was treated with carbamoylmethylenetriphenylphosphorane (638 mg., 2 mmole) and the mixture was kept at 20° for 30 minutes. The solution was cooled to 0° and diphenylmethyl 3- iodomethyl-7β-(thien-2-ylacetamido) ceph-3-em-4-carboxylate (630 mg. 1 mmole) in methylene dichloride (10 ml.) was added. After 10 minutes at 0° the mixture was washed with 2N-hydrochloric acid, and water, and the organic solution was dried and evaporated *in vacuo*. The residual foam, in chloroform, was run on to a column of Kieselgel (30 g.).

The column was eluted with chloroform: acetone=19:1 and fractions (5 ml.) containing material with $R_f$ ca. 0.5 (System E) were combined and evaporated in vacuo. The residue (290 mg.), in methylene dichloride, was run into petroleum (b.p. 40 to 60°) to give the *monosubstituted cyanoacetate* (284 mg.) as an amorphous solid, $[\alpha]_D^{22}$ —25° (c 1.0, CHCl$_3$). This material had the same spectral characteristics as those of the material described in Example 3b.

Column-fractions containing material with $R_f$ ca. 0.25 (System E) were combined and evaporated in vacuo. The residue (182 mg.) was purified further by preparative t.l.c. (on Merck Silica Gel HF$_{254, 366}$, developed twice with benzene:ethyl acetate=5:1) and finally by crystallisation from ethanol to give the *di-substituted cyanoacetate* (65 mg.) as prisms, m.p. 132 to 135°, $[\alpha]_D^{22°}$+29° (c 0.7, CHCl$_3$). This material had the same spectral characteristics as those of the compound described in Example 5a.

EXAMPLE 16

Diphenylmethyl 3-(2ξ-Cyano-2ξ-methoxycarbonylethyl)-7β-(thien-2-ylacetamido)ceph-3-em-4-carboxylate and Methyl 2-Cyano-2, 2-bis[4-diphenylmethoxycarbonyl-7β - (thien - 2 - yl - acetamido)ceph-3-em-3-ylmethyl] acetate A suspension of ethoxycarbonylmethyldimethylsulphonium bromide (229 mg. 1 mmole) in dry tetrahydrofuran (6 ml.) with *tert*-butanol (3 ml.) was treated with sodium hydride (100 mg. of a 50% dispersion in mineral oil, ca. 2 equivalents) and the mixture stirred at 20° for 1½ hours. The mixture was filtered and the solvents removed in vacuo. The oily sulphurane, in methylene dichloride (2 ml.), was added to a solution of methyl cyanoacetate (0.5 ml.) in methylene dichloride (8 ml.) and the mixture was kept at 20° for 15 minutes. The solution was cooled to 0° and diphenylmethyl 3-iodomethyl-7β - (thien - 2-ylacetamido)ceph-3-em-4-carboxylate (315 mg., 0.5 mmole), in methylene dichloride (5 ml.), was added. After 10 minutes at 20° the mixture was washed with 2N-hydrochloric acid, and water and the organic solution was dried and evaporated in vacuo. The residual foam (266 mg.) was purified by preparative t.l.c. (on Merck Silica Gel HF $_{254,636}$ developed twice with benzene:ethyl acetate=5:1) to give the mono-substituted cyanocetate (90 mg.) as a foam and the di-substituted cyanoacetate (45 mg.) as an amorphous solid. Both materials had similar spectral characteristics to those of the compounds described in Examples 3b and 5a respectively.

We claim:

1. In a process for the preparation of a cephalosporin compound having a substituted methyl group at the 3-position, the step of contacting a cephalosporin compound of the formula

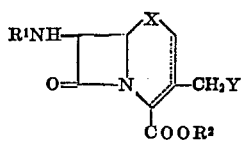

wherein $R^1$ is hydrogen or a carboxylic acyl group of 1-20 carbon atoms, Y is a chlorine, bromine or iodine atom, $R^2$ is hydrogen or a carboxyl-protecting group, X is >S or S→O (α or β) and the dotted lines between the 2-, 3- and 3-, 4-positions indicate that there is depicted either a ceph-2-em or ceph-3-em compound with an onium salt of the formula [(R$^3$)$_n$A]$^+$Z$^-$ wherein each of the groups R$^3$ is hydrogen, C$_1$-C$_8$ alkyl, cyclopentyl, cyclohexyl, C$_7$-C$_{12}$ aryl lower alkyl or C$_6$-C$_{10}$ aryl, the groups R$^3$ in the aggregate containing at least 2 carbon atoms; A is a nitrogen, phosphorus, arsenic, antimony or sulphur atom; n is the integer 3 or 4 and Z$^-$ is the anion of the acid ZH which has a pKa greater than that of the acid YH but not more than 14, as measured in water at 25° C.

2. A process as defined in claim 1 wherein Z$^-$ is the moiety [CR$^4$R$^5$R$^6$]$^-$ wherein at least one of R$^4$, R$^5$ and R$^6$ is —CO$_2$R$^7$, —COR$^7$, —S(O)R$^7$, —S(O)$_2$R$^7$, —NO$_2$ or —CN wherein R$^7$ is C$_1$-C$_8$ alkyl, C$_7$-C$_{12}$ aralkyl, C$_6$-C$_{10}$ aryl, cyclopentyl or cyclohexyl and such of R$^4$, R$^5$ and R$^6$ as remains is alkyl of 1 to 8 carbon atoms, cyclopentyl, cyclohexyl, C$_7$-C$_{12}$ aryl (lower alkyl) or C$_6$-C$_{10}$ aryl.

3. A process as defined in claim 1 wherein the starting cephalosporin compound is contacted with the onium salt in an aprotic solvent selected from the group consisting of methylene chloride, chloroform, benzene, toluene, tetrahydrofuran, dioxan, 1,2-dimethoxyethane, diethyl ether or ethyl acetate.

4. A process as defined in claim 1 wherein the onium salt has a distribution constant (K=$C_{CH_2Cl_2}/C_{H_2O}$) of more than 0.1.

5. A process as defined in claim 1 carried out in methylene chloride or chloroform.

6. A process as defined in claim 1 wherein each R$^3$ group is n-butyl and A is nitrogen.

7. A process as defined in claim 1 wherein the charge and nucleophilic properties of Z$^-$ are concentrated on an atom selected from the group consisting of carbon, oxygen, halogen, sulphur, phosphorus and nitrogen.

8. A compound selected from the group consisting of 3-(2-ξ-Benzoyl-3-oxobutyl)-7β-(thienylacetamido) ceph-3-em-4-carboxylic acid, 7β-(D-2-Amino - 2 - phenylacetamido)-3-(2ξ-t-butoxy-carbonyl-3-oxobutyl) ceph-3-em-4-carboxylic acid and a compound of the formula

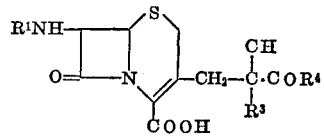

wherein R$^1$ is thienylacetyl or D-2-amino-2-phenylacetyl; R$^3$ is hydrogen C$_1$-C$_8$ alkoxy and a nontoxic pharmaceutically acceptable salt of said compound.

9. A compound as defined in claim 8 which is 3-(2ξ-Cyano-2ξ-methoxycarbonylethyl) - 7β - (2-thienylacetamido)ceph-3-em-4-carboxylic acid.

10. A compound as defined in claim 8 selected from the group consisting of 7β-(D-2-Amino-2-phenylacetamido)-3-(2ξ-cyano - 2ξ - methoxycarbonylethyl)ceph-3-em-4-carboxylic acid and its trifluoroacetic acid salt.

References Cited

UNITED STATES PATENTS 3,687,948   8/1972   Crast _____ 260—243 C

NICHOLAS S. RIZZO, *Primary Examiner*

U.S. Cl. X.R.

424—246